US010871876B2

(12) United States Patent
Woodward

(10) Patent No.: US 10,871,876 B2
(45) Date of Patent: Dec. 22, 2020

(54) 3-DIMENSIONAL DIPOLAR MODULAR ASSESSMENT OF PERCEIVED CHANGE

(71) Applicant: Justin David Woodward, Madison, WI (US)

(72) Inventor: Justin David Woodward, Madison, WI (US)

( * ) Notice: Subject to any disclaimer, the term of this patent is extended or adjusted under 35 U.S.C. 154(b) by 249 days.

(21) Appl. No.: 15/910,967

(22) Filed: Mar. 2, 2018

(65) Prior Publication Data

US 2019/0272079 A1    Sep. 5, 2019

(51) Int. Cl.
*G06F 3/0481*    (2013.01)
*G06T 19/00*    (2011.01)
*G06F 16/904*    (2019.01)

(52) U.S. Cl.
CPC ........ *G06F 3/04815* (2013.01); *G06F 16/904* (2019.01); *G06T 19/003* (2013.01)

(58) Field of Classification Search
CPC .............................. G06F 3/0485; G06F 16/904
See application file for complete search history.

(56) References Cited

U.S. PATENT DOCUMENTS 4,819,656 A     4/1989 Spector
10,503,964 B1 * 12/2019 Valgardsson ..... G06F 16/24575

| | | | |
|---|---|---|---|
| 2009/0281896 A1 * | 11/2009 | Brooks | G06F 3/04842 705/14.44 |
| 2011/0066036 A1 * | 3/2011 | Zilca | A61B 5/16 600/483 |
| 2012/0209793 A1 * | 8/2012 | Morris | G06F 16/9032 706/11 |

(Continued)

OTHER PUBLICATIONS

Panadero, Ernesto, "A Review of Self-regulated Learning: Six Models and Four Directions for Research", "Frontiers in Psychology", vol. 8, pp. 1-28 (Year: 2017).*

(Continued)

*Primary Examiner* — Terrell M Robinson
(74) *Attorney, Agent, or Firm* — Rudy Moore

(57) ABSTRACT

Methods and systems for assessing perceptual characteristics are provided. In one embodiment, a process is applied which includes receiving at a processing device a first individualized perceptual domain, a second individualized perceptual domain, and a third individualized perceptual domain; receiving a first perceptual characteristic range of a behavior from the first individualized perceptual domain; receiving a second perceptual characteristic range of the behavior from the second individualized perceptual domain; receiving a third perceptual characteristic range of the behavior range from the third individualized perceptual domain; creating a current perceptual range from the first perceptual characteristic range of the behavior, the second perceptual characteristic range of the behavior, and the third perceptual characteristic range of the behavior; converting the current perceptual range into a 3-dimensional representation of the current perceptual range within the first individualized perceptual domain, the second individualized perceptual domain, and the third individualized perceptual domain; and presenting the 3-dimensional representation of the current perceptual range.

20 Claims, 8 Drawing Sheets

(56) References Cited

U.S. PATENT DOCUMENTS

| | | | |
|---|---|---|---|
| 2012/0214143 A1* | 8/2012 | Severson | G16H 50/30 |
| | | | 434/236 |
| 2014/0032277 A1* | 1/2014 | Kashyap | G06Q 10/06393 |
| | | | 705/7.39 |
| 2016/0246863 A1* | 8/2016 | Sexton | G06F 16/26 |

OTHER PUBLICATIONS

Olsen, David H. (1989), Family Assessment and Intervention: The Circumplex Model of Family Systems. Child and Youth Services, 11(1), 9-48. Relevant Passage: p. 10, Paragraph 4.

Lövheim, Hugo. (2011), A New Three-Dimensional Model for Emotions and Monoamine Neurotransmitters. Medical Hypotheses, vol. 78, Issue 2, 341-348. Relevant Passage: p. 342, Paragraph 2.

Groth-Marnat, Gary. (2003). The Handbook of Psychological Assessment (4th Edition) John Wiley and Sons. New Jersey. Relevant. Passages: p. 82, Paragraph 3; p. 130. Paragraph 4; p. 140,141, Paragraph 3, 3: p. 407, Paragraph 2; p. 479, Paragraph 4.

Kasser, T. (2014). Teaching about Values and Goals: Applications of the Circumplex Model to Motivation, Well-Being, and Prosocial Behavior. Teaching of Psychology, 41(4), 365-371. Relevant Passage: p. 365, Paragraph 2.

Skinner, B. F. (1938). The Behavior of Organisms. Appleton Century-Crofts, Inc. New York. Relevant Passage: p. 439, end of Paragraph 1.

* cited by examiner

3-DIMENSIONAL DIPOLAR MODULAR ASSESSMENT OF PERCEIVED CHANGE

FIELD

Embodiments of the present application relate to the field of psychological evaluation.

BACKGROUND

Assessment is a crucial part of any process that involves change. Whether the assessment is informal or standardized, the process of evaluating how much something has changed in human experience is sometimes difficult to determine and often tends to be a matter of perspective, rather than an objective measurement. Whether the change occurs on an individual level where someone is attempting to articulate their own perception of a change process, or on a corporate level where the atmosphere of an agency's culture, alignment of employees on corporate goals and the perception of its employees about changes that are made is necessary for a company to maintain stability. We are awash in data currently, and the instruments we currently use to compile and understand this data are limited. Most assessments of human experience attempt to do this via average scores in comparison to the general population, by self-report and attempts at codifying language, or by utilizing questionnaires that are designed to target specific areas of concern that are designated by specific assessment and presume that changes in these areas represent an overall change. Currently, assessment strategies that attempt to quantify a person's overall perception of change are incomplete. What is needed is a tool for communicating the subjective perceptions of the user.

Part of the difficulty in quantifying perception of change is that it is so variable. Human perception is far from objective and varies so widely between individuals that in research, the issue of inter-rater reliability among individuals who assess change can be a significant problem in the reliability and validity of a study unless extensive training and rigor is implemented in order to counteract this phenomenon. Individuals who undergo a change often have very different goals from each other, and the complexity of human perception can yield multitudes of results from just changing a single variable. Even the process of measurement itself can skew results in ways that make research inherently biased in favor of a researcher's hypothesis. This is the reason that double blind studies are required in research that has the potential to suffer from this problem, such as in variations on B. F. Skinner's experiments in operant conditioning. Furthermore, a person's perception of a stimulus that might normally be perceived as neutral can easily be skewed towards positive or negative perception. This variability impacts the reliability and validity of research.

Most attempts to account for this variability do so by ignoring differences in perception altogether and simply studying changes in physically measurable phenomena, typically this is referred to as quantitative data collection. The physical sciences are the primary domain of these methods. In the area of life science, quantitative methods have grown in use, and with the advancement of technological complexity, ever more complex systems can be quantitatively captured and analyzed. Tools such as fMRI, EEG, even measures of the amount of certain hormones in blood such as cortisol, have become increasingly important tools to researchers that wish to quantify the human condition. These methods are important and provide valuable data that is as objective as possible, and certainly does give us the ability to quantify information so that we can effectively compare results and make determinations about how individuals compare to the broader population. The need for quantitative data remains necessary for understanding objectively measurable phenomena, as well as understanding how individuals match patterns that are seen within a larger group. Behavioral psychology, physics, chemistry, economics, neuroscience and many other areas of science all rely on statistical analysis of quantified replicable data to understand the world around us in more depth. Where these methods fall short are in attempts to quantify the perceived human experience of this measurable physical world. As our culture shifts to more individualized environments, the need arises to gather more representative information of a specific individual's understanding of an experience.

Qualitative methods of gathering data are the primary way that the variability in human experience is recorded directly. Structured interviews, scaling questions, multiple choice questions, and any other language-based methods are inherently qualitative, though many are still thought to be quantitative due to their reliability in determining specific results. Their qualitative nature is compensated for by standardizing data, utilizing statistical analysis to allow probability to increase confidence in results and addressing flaws in one measurement system by introducing a second or third assessment to confirm results. All these methods must be validated in order for individuals conducting the research to have sufficient confidence that they are measuring what they are intending to measure. These measurement tools are frequently validated against quantitative measurements.

Typically, the most efficient way to evaluate a person's perception is communicated via linguistic methods. Among the many types of assessment using linguistic communication, there is a spectrum from most to least subjective means of gathering data. Structured interviews are the most open ended and therefore fall on the side of being one of the most subjective methods, but they are also often the most comprehensive and representative of an individual's unique perspective. They allow people to use their own language to answer more general questions. These tend to be quite lengthy, and require considerable experience to interpret and evaluate results. Additionally, it is difficult to adjust for inter-rater reliability concerns. Typically, these methods either measure change retrospectively via questions such as 'Tell me how this problem has changed for you?' or are evaluated over a course of time by an ongoing psychiatrist or therapist, who keep records of goals and progress on these goals via a system of intake assessments, progress notes, quarterly and ongoing assessments. This process is cumbersome and depends on the professional performing it and is therefore less customizable, is intangible, and slow.

On the other end of this spectrum are methods like scaling questions, which ask people to rate on a subjective scale that allows for some variability. Typically each point in this scale will have a qualifying statement such as 1—'not at all like me', 2—'a little like me, 3—'somewhat like me', 4—'very much like me' and 5—'exactly like me' in answer to a question like 'I keep to myself.' These scales are described as subjective because the intention of the question can be very different than what is perceived by the person taking the assessment. A frequent concern for these types of evaluations is that they only allow for whole number answers and they require a person to take their experience over the last 2 weeks and average it into one number. People are generally quite bad at making these sorts of evaluation of their behavior. Compared to observational data, individuals' reports of their behaviors are either under-reported or exaggerated, and rarely match objective measurements of behaviors.

Furthermore, it is frequent that individuals will report that they want to mark ½ way between 2 and 3, or that it depends on the context, and the scales may not allow for these sorts of variability. There is likely meaning behind a desire such as this, though little attention is paid to this shortcoming. Additionally, individuals frequently note that the words do not match the individual's experience: they may wish to express a more subtle change than the scale allows for or something else is causing them to adjust their score in this way. Either way, the human perceptual experience that the individual reports differs from the available scale and is rarely captured unless it is in an informal note in the margin. This frequently does not come across in statistical analysis. It is quite likely that much of this experience goes unrecorded, and the unique perspectives of individuals are being lost for the sake of a tool that is 'close enough.' The most extreme form of scaling questions that limit choices will express a statement and ask a person to choose between 2 options—"true or false" or "agree or disagree". These tests are inflexible and incomplete in terms of understanding an individual's experience, which undermines any advantage in higher inter-rater, and test-retest reliability.

Other more comprehensive methods of assessment exist, and have the ability to more completely explain a certain aspect of a person's experience. Intelligence, for example, has been traditionally measured by IQ, which is often assessed using tests such as The Weschler Adult Intelligence Scale (WAIS). The WAIS has several areas that it assesses and uses to determine both an overall score that it can compare to individuals in a given age group, but also provides validation within the test itself to confirm that the scores provided are consistent with each other. The WAIS generally is considered to be an assessment that allows a person with sufficient training in interpretation of the results to make a determination about how a person rates in comparison to others in their age group. It is a timed test, and the answers tend to increase in difficulty, and the speed at which the answers are given partially determines the outcome. The tests that are done are less reliant on language, and often come closer to measurement of perception, though there are typically specific goals that each test requires. Though it captures some very different information about a person's abilities, the subjective experience of change itself is rarely, if ever measured and tends to go unquantified. In order to measure change for tests such as these, one must take the test again at a later date, and compare the two test results. Typically, IQ is considered to be something that does not change often over time, but there are some areas that can change. These assessments are inflexible, not tangible, and not customizable. Further, they do not account for an individual's ideal, but rather just an absolute ideal.

With so much raw data available in our world currently, data visualization has become a way of making sense of so much information in ways that human minds can process more readily. The reason that putting data into visual form is so helpful is because it translates something very abstract like math into something which is the human mind is particularly adept at understanding and manipulating-space. Math and language require an individual to first know the background and rules of the system and then understand how to effectively compile and make sense of a vast amount of information. Even with the tools available like statistical analysis, spreadsheets and databases, one still needs to understand things like p-value, variance, sample size and statistical significance to truly understand what data actually means when presented in non-visual format. Data visualization allows for information to be consolidated into a format that can be more easily understood. In its simplest form, tools such as bar graphs, pie charts, and line graphs provide a way to see and compare data in ways that allow for better understanding of context and significance. This method has been used for things such as mapping the world wide web, or even creating flow charts. Despite the ubiquity and usefulness of data visualization, the methods have not been brought into data gathering nearly as much. Simple outputs of data into a graph, or creating a visual representation of data that is gathered is standard practice, but the data visualization itself appears to be an 'output only' type of medium. Individuals do not change the data based on what they see, and although what they see might adjust their understanding of the data, they don't go back and change the data to best reflect how they perceive it. This would fundamentally corrupt the data that was gathered, and this, in the world of assessment is highly discouraged, and typically 'data manipulation.'

Some explanatory models attempt to show more broad areas of human behavior as observed by an outside entity and display them in a visual format such as the Circumplex model or the Lovheim model of emotion. These methods tend to use more objective means to create the data such as measurement of neurotransmitters or simply keep the information as conceptual. They do not to allow for interaction with the model and do not show the range of data present. These methods do not allow the user to determine the ideal result of therapy nor do they represent an individual's unique perception. The type of data collected is set by the method and frequently misses out on characteristics important to the individual.

Tools that measure objective data and use feedback loops to help retrain and modify behavior are becoming mainstream. For example, some instruments use biofeedback to teach a user new behaviors. These systems read an individual's biometric responses such as patterns of breath, heart rate, galvanic skin resistance, or skin conductance. A user modifies their behavior in order to see different biometric responses. This is repeated in a loop until the user's behavior produces a desired biometric response. Biofeedback has been shown to be quite effective in reducing stress, since the data that is measured is related to stress level. Biofeedback have come the closest to providing a means of quantitatively measuring and providing a means for an individual to interact with their own experience with the world. This process is slow to learn and not customizable to the user's experience. It does not account for the range of human experience, but is tailored to just the situation that the system is designed for. The lack of flexibility means that the user cannot specify the ideal results.

Behavior modification systems like those pioneered by Skinner and Pavlov are standard in practices such as psychotherapy or education. These often focus on observable responses to external stimuli including self-report, observed behavior, measured physiological responses, etc. Those systems that attempt to measure and change perception do so by measuring observable data, and are this way for a good reason. In order to effectively study perception, data needs to be collected in a way that is as reliable and quantitative as possible. Qualitative methods are generally supplementary to quantitative methods, and tend to attempt to make these qualitative reports as measurable and quantitative as possible. Subjectivity is largely ignore and cited as a shortcoming in assessment. Where not ignored, subjectivity is frequently accepted as a 'necessary evil' or attempts are made to minimize it as much as possible. The challenge with this is that perception is inherently subjective. One individual's perception of an experience can differ from another's. Even the individual who had the experience can adjust their perception over time. There are few fixed points or areas where this experience can be reliably quantified.

One of the best tools we have at present for closely documenting change and describing current and ideal experience is one that is fairly primitive but still fairly effective. The method of journaling and documenting perception through a narrative intended to capture the experiences in one's life at a given moment in time is a tool that is very useful. Looking back at one's previous thoughts and perceptions of a situation provide a kind of perspective that is difficult to emulate. Consistency of this method is generally only present with individuals who value consistency. The difficulty in expressing and representing what an individual's experience is lies in the nature of the way that it is communicated. These narratives tend to be lengthy and time consuming to create and evaluate. They do not tend to present a cohesive way of consolidating experiences effectively. Journaling and evaluating change requires a lot of expertise of the subject and therapist.

Assessment methods have not undergone much change other than improvements and adaptations of the methods that have been discussed. Thus, it is important to be able to create a system to express and modify an individual's perception in a way that is flexible, tangible, customizable, interactive and quickly recorded. It is also important to ensure that a subjective system shows information in a way that accounts for the range of perception that is inherent in human experience. A better system allows for a flexible way to set and compare present perception and one's ideal perception. Until now, there has not been a method that satisfies these objectives.

SUMMARY

The embodiments presented within provide methods and systems for assessment of behavioral characteristics and will be understood by reading and studying the specification.

Methods and systems for assessing perceptual characteristics are provided. In one embodiment, a process is applied which includes receiving at a processing device a first individualized perceptual domain, a second individualized perceptual domain, and a third individualized perceptual domain; receiving a first perceptual characteristic range of a behavior from the first individualized perceptual domain; receiving a second perceptual characteristic range of the behavior from the second individualized perceptual domain; receiving a third perceptual characteristic range of the behavior range from the third individualized perceptual domain; creating a current perceptual range from the first perceptual characteristic range of the behavior, the second perceptual characteristic range of the behavior, and the third perceptual characteristic range of the behavior; converting the current perceptual range into a 3-dimensional representation of the current perceptual range within the first individualized perceptual domain, the second individualized perceptual domain, and the third individualized perceptual domain; and presenting the 3-dimensional representation of the current perceptual range.

In another embodiment, the method presented is expanded to further include receiving a fourth perceptual characteristic range chosen from the first individualized perceptual domain; receiving a fifth perceptual characteristic range of the behavior chosen from the second individualized perceptual domain; receiving a sixth perceptual characteristic range of the behavior range chosen from the third individualized perceptual domain; receiving a new current perceptual range from the fourth perceptual characteristic range of the behavior, the fifth perceptual characteristic range of the behavior, and the sixth perceptual characteristic range of the behavior; and presenting a time series of a new 3-dimensional representation of the current perceptual range within the first individualized perceptual domain, the second individualized perceptual domain, and the third individualized perceptual domain and the new current perceptual range within the first individualized perceptual domain, the second individualized perceptual domain, and the third individualized perceptual domain.

In another embodiment, the method presented is expanded to further include presenting the time series as an animation wherein the animation shows a change over time from the current perceptual range to the new current perceptual range.

In another embodiment, the method presented is expanded to further include receiving a first ideal range chosen from the first individualized perceptual domain; receiving a second ideal range chosen from the second individualized perceptual domain; receiving a third ideal range chosen from the third individualized perceptual domain; creating an ideal range from the first ideal range, the second ideal range, and the third ideal range; and presenting a new 3-dimensional representation of the current perceptual range within the first individualized perceptual domain, the second individualized perceptual domain, and the third individualized perceptual domain and the ideal range within the first individualized perceptual domain, the second individualized perceptual domain, and the third individualized perceptual domain.

In another embodiment, the method presented is expanded to further include labeling a first axis with a first name of the first individualized perceptual domain; labeling a second axis with a second name of the second individualized perceptual domain; and labeling a third axis with a third name of the third individualized perceptual domain.

In another embodiment, the method presented is expanded to further include labeling a first axis with a first name of a first maximum of the first individualized perceptual domain; labeling a second axis with a second name of a second maximum of the second individualized perceptual domain; labeling a third axis with a third name of a third maximum of the third individualized perceptual domain.

In another embodiment, the method presented is expanded to further include labeling a first axis with a first name of a first minimum of the first individualized perceptual domain; labeling a second axis with a second name of a second minimum of the second individualized perceptual domain; and labeling a third axis with a third name of a third minimum of the third individualized perceptual domain.

In another embodiment, the method presented is modified such that the first individualized perceptual domain, the second individualized perceptual domain, and the third individualized perceptual domain are pre-selected by an outside entity.

In another embodiment, the method presented is expanded to further include modifying the first ideal range from the first individualized perceptual domain; modifying the second ideal range from the second individualized perceptual domain; modifying the third ideal range from the third individualized perceptual domain; creating a modified perception range from the first ideal range of the behavior, the second ideal range of the behavior, and the third ideal range of the behavior; and presenting a 3-dimensional representation of the current perceptual range within the first individualized perceptual domain, the second individualized perceptual domain, and the third individualized perceptual domain.

In another embodiment, the method presented is modified to further include receiving a first pre-selected range regarding the first individualized perceptual domain; receiving a second pre-selected range regarding the second individualized perceptual domain; receiving a third pre-selected range regarding the third individualized perceptual domain; creating a pre-selected range from the first pre-selected range, the second pre-selected range, and the third pre-selected range; and presenting a 3-dimensional representation of the current perceptual range and the pre-selected range.

In another embodiment, the method presented is expanded to further include receiving a first context wherein the current perceptual range applies; receiving a second context wherein a second perception range applies; presenting the 3-dimensional representation of the current perceptual range and a second 3-dimensional representation of the second perception range within the first individualized perceptual domain, the second individualized perceptual domain, and the third individualized perceptual domain; and labeling the 3-dimensional representation of the current perceptual range with the first context and the second 3-dimensional representation of the second perception range with the second context.

In another embodiment, the method presented is modified such that the second context is a sub-context of the first context.

In another embodiment, the method presented is expanded to further include presenting a relationship between the first context and the second context.

In another embodiment, the method presented is modified such that the first individualized perceptual domain is a quantity of a behavior, the second individualized perceptual domain is a quality of the behavior, and the third individualized perceptual domain is a frequency of the behavior.

Embodiments presented include a storage device storing instructions that are executable to perform the operations of the method presented. Embodiments presented also include a computer-implemented system comprising one or more processors and a storage medium containing instructions configured to perform the operations of the method presented.

BRIEF DESCRIPTION OF THE DRAWINGS

FIG. 6 is an illustration of a set of steps that allow the tool to present a time-varying perception across the domains the user is interested in.

DETAILED DESCRIPTION

The tool described is a modular assessment tool in which a user can create a customizable multi-dimensional representation of their perception of at least three areas of focus that they wish to evaluate for change. The tool transforms the chaotic understanding of a user's conscious perception into a form in which conclusions can be drawn and progress can be tracked. A user can effect personal change when the user has a better understanding of how a user's current perception correlates to real expressed behaviors and to ideal expressed behaviors. Each area of focus is referred to as a domain. A domain includes an area of focus that may be represented on a scale, frequently either linear or logarithmic, but other scales may apply. The domain measures the characteristics of interest to the user. The description below considers a user, a patient, a therapeutic client, an employee, a customer, a subject of an experiment, or any other outside entity entering data into the tool. The outside entity could equally be any other user, such as a therapist providing treatment. Further, the data could be entered by a combination of the patient and any number of outside entities, as fits a particular application. The tool may be interactive. The visualization of the user's input could change their perception of it, and thus, the user can then go back and change the input to reflect how their perception has changed. Because the tool is versatile, it can be used as a data visualization tool for pre-existing models such as the circumplex model, adult attachment inventory, or personality inventories such as the Myers-Briggs. The description below describes a particular order in which the steps are performed, however other orders may make equal sense and are considered as well.

Figure 1:
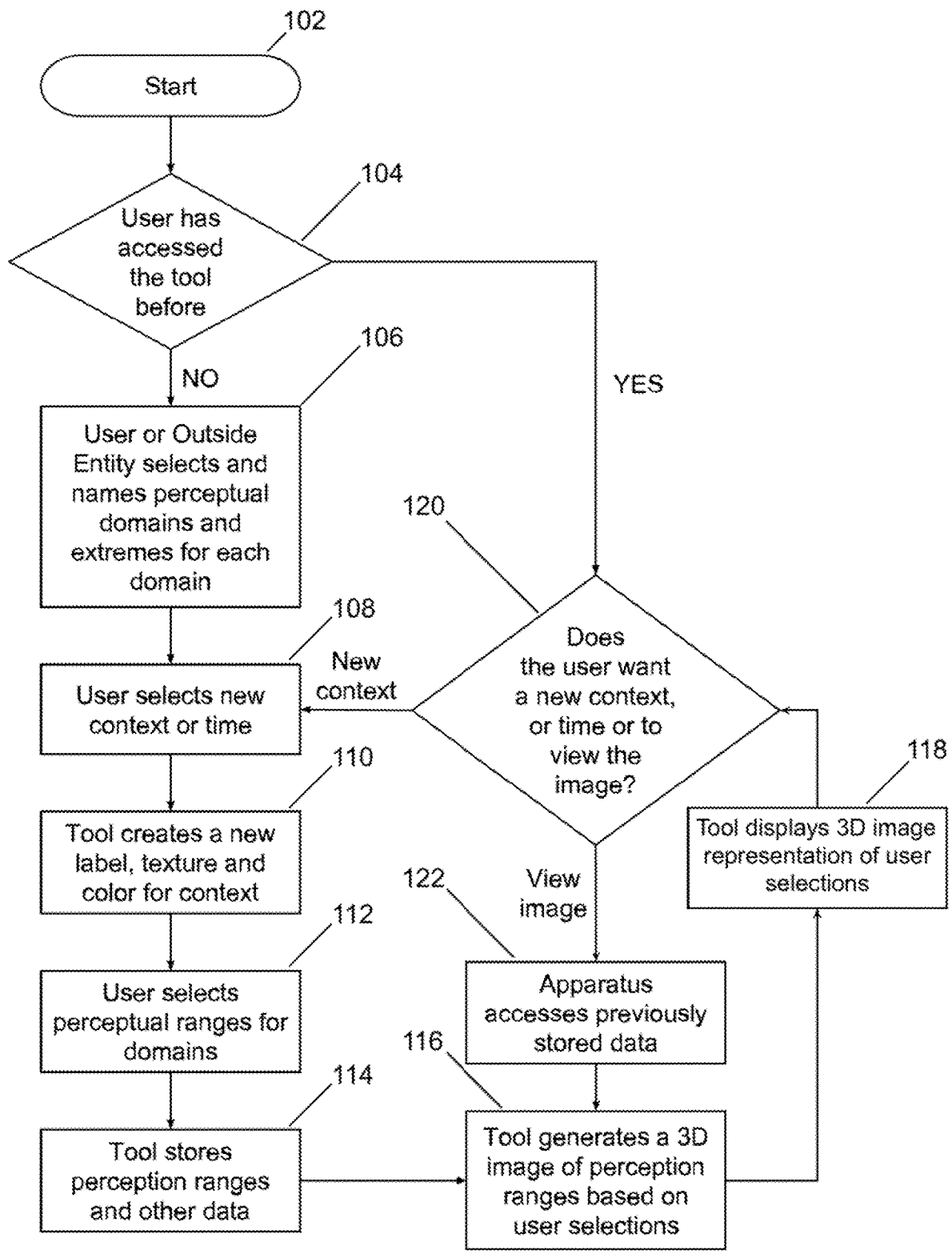
FIG. 1 is an illustration of a flow chart of an example of a modular assessment tool in use.

FIG. 1 is an illustration of a flow chart of an example of a modular assessment tool in use. The modular assessment tool guides the patient through the steps of the flowchart. In step 102, the tool presents an empty multi-dimensional space and a user interface. The multi-dimensional space can be three-dimensional to show the collected data as a volume in space.

In step 104, the tool determines whether the user has accessed the tool before. If the user has not, the tool enters step 106 where the user or an outside entity selects and names the perceptual domains that are of interest. The user or outside entity selects the extremes for each of the domains. These domains are areas of focus that will be analyzed by the tool. The domains may be linear ranges with boundaries that describe the extremes of a range within the domain. For example, one domain could be "frequency" with boundaries labeled "always" and "never." Domains and the domain's extremes may be preconfigured by an outside entity and simply selected by a patient. Alternatively, the patient can create a domain and the domain's extremes. Other examples of domains include but are not limited to social orientation (extremes for which may be self and others), change orientation (extremes for which may be accept all and change all), action orientation (extremes for which may be reactive and strategic), and others.

In step 108, the user selects a first context. The first context includes an environment or activity or other situational characteristic that affects the subsequent selections. Some situational characteristics might include, but are not limited to, time, location, weather, people nearby, social contexts, health, and other characteristics that affect behavior or perception of the user. Similar to the ability to adjust domain, adjusting context is another element of this tool. Multiple contexts are not only a reasonable option, it amplifies the usefulness of the tool. The context may be chosen entirely by the user or may be selected from one or more preselected contexts. Contexts may include other contexts. For example, one context could be when the user is feeling upset, certain characteristics are present. Another context could be a work environment. The behavior of interest could then be considered while feeling upset in a work environment.

In step 110, the tool creates labels, textures, colors, and potentially other characteristics for the selected context. These characteristics may be drawn on the user interface or drawn later in the process.

In step 112, the patient considers each of the domains and selects a perceptual range from within that domain. The perceptual ranges are specific to the context. For example, on a "frequency" domain, the patient can choose a minimum slider just to the right of "never" and a maximum slider just to the left of "always." In this example, perceptual range then implies that the frequency of the observation is highly variable. The trait in the domain happens more than never, but less than always. In this case, the sliders are intentionally vague to correlate with the idea that a patient may have a hard time pinning down a specific frequency but an easier time pinning down a relative frequency. This is also because human perception tends to be less easily defined, and allows the user to more intuitively select the range that reflects their conceptualization of their own perception. Alternatively, the patient may know that the trait in the domain happens less than half the time. The patient would select the maximum slider to somewhere less than halfway along the frequency domain. In certain instances, additional data points for a particular domain may make sense. For example, the user may know a event happened a particular number of times, but have a general feeling that a different minimum or maximum apply. Thus the user may want to select a specific data point to add to a domain. This also can illustrate how outliers may not represent the majority of behaviors, and show that most behaviors occur in a more central area. The shape for this would allow for a wider shape at certain parts of the shape. For some perceptual ranges, no vagueness will be necessary and the tool can display labels that are more determinate.

A perceptual range is important because characteristics of domains are frequently diffuse along a range and are not always the same from one moment to the next. Though it is easier to describe single data points, it is usually not representative of how people think of their own behavior. People can more easily articulate their perceptions by the extremes of behaviors. It is much easier to say, 'it's not less than x amount,' or 'I don't do it more than x' than 'I think I average about x.' The tool accommodates the uncertainty of perception of qualities and therefore gives better indication of the actual state of a domain than a concrete, but inaccurate, recording of a perception would. In step 114, those perceptual ranges are stored.

In step 116, the tool reconfigures the empty multi-dimensional space. In one example, the tool may use three or more domains and labels and a three-dimensional space to represent those domains. A two-domain system may similarly use a two-dimensional space to represent those domains. The labels can include the name of the domain and the domain's extremes. Between the labels, the domain may have no graduations to emphasize that some domains are inherently non-quantified. Alternatively, where it makes sense, domains that are more easily quantifiable may include graduation marks. The tool creates and displays an image based on the perceptual ranges. In step 118, the image of a volume is placed within the domain labels such that the patient can see the relative position of each of the perceptual ranges. The interaction between the visual representation and the user's report through the range sliders allows the user to adjust the output to match their 'feeling.' In this way, the user can effectively represent what they want the output to look like.

In step 120, the tool determines if the user wants to enter a new context or view an image of the perception ranges. This step may be entered from close to the program beginning or may be entered after a prior image has been generated. When viewing an image is selected, the tool accesses previously stored data in step 122. This data may correspond to recently entered perceptual data or historic perceptual data. That data is used to generate an image in step 116. The ongoing visual feedback allows the user to fine-tune the object that the tool displays so that it matches their perception, and thus, the tool enables a change from abstract perceptions and experiences into a symbolic object that can be manipulated.

Figure 2:
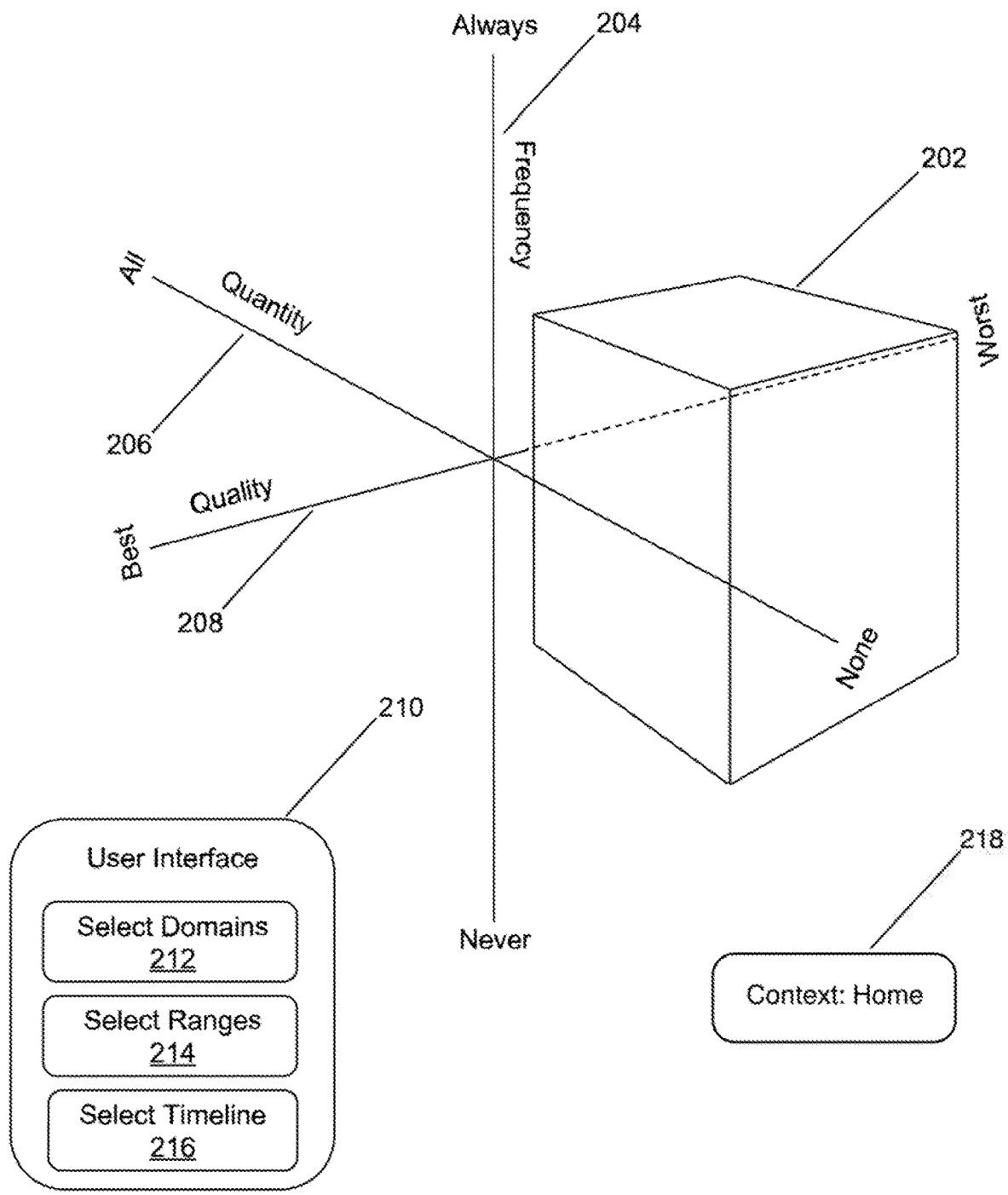
FIG. 2 is an illustration of one example of a display the tool provides to the user as generated through the process illustrated by FIG. 1.

FIG. 2 is an illustration of one example of a display the tool provides to the user as generated through the process illustrated by FIG. 1. Prominently displayed is the three-dimensional block 202. While this three-dimensional block 202 is shown as a cube, an ellipsoid or similar shape may make more sense contextually. Similarly, the boundaries of the three-dimensional block 202 may be diffuse rather than sharply defined. The boundaries of the three-dimensional block 202 are specified by the perceptual ranges entered by the user. Frequency axis 204, quantity axis 206, and quality axis 208 are example of potential domains previously specified.

This tool allows for a process that can make more abstract ideas into concrete, malleable objects. Generally, an individual can change a goal in order to be more realistic about what is achievable, but it is often difficult to conceptualize what this means. The shape of the three-dimensional block 202 and its location on the graph represents the areas that the individual wishes to focus on as defined by the domains. This process externalizes the present condition and the goals of the user. The user may then manipulate and change the diagram. In changing the diagram, the user can internalize the changes in their present beliefs and goals. By internalizing the changes, the user can move toward those goals in a more concrete and focused way. The changes that take place in the tool can then be acted upon by the user in more specific ways.

As an illustrative example, if a user is 'unhappy' with their present circumstances, they can often articulate this by simple verbalization of the feeling of unhappiness, but it's difficult to determine exactly what to change. Using the tool with axes displayed in FIG. 2, one can place more specific emphasis on what makes them unhappy, and to what degree. There are three obvious areas of focus that may influence unhappiness. The user can independently examine frequency, quality, and quantity of a perceived trait to shift the trait to provide more happiness. Once the user is able to see this, they can then seek out better quality in the area that they are unhappy in, as well as a higher quantity. This is dependent on the trait measured, however, as it may be true that the quantity of more unhealthy habits would likely be something that the user would want closer to none, and the quantity of healthy, desired behaviors would be closer to "all." Any particular trait and the measurements of the characteristics of that trait can be analyzed independently depending on the user's preference and circumstantial needs.

The user interface 210 shown is an example of one method the tool remains interactive with the user. Shown, the user may use the select domains button 212 to record and display new domains. The user may use the select ranges button 214 to enter new perceptual range data. The user may use the select timeline button 216 to enter time related data as described below. Context button 218 may be used to select a particular context, currently showing a "Home" context, but other contexts are possible.

Figure 3:
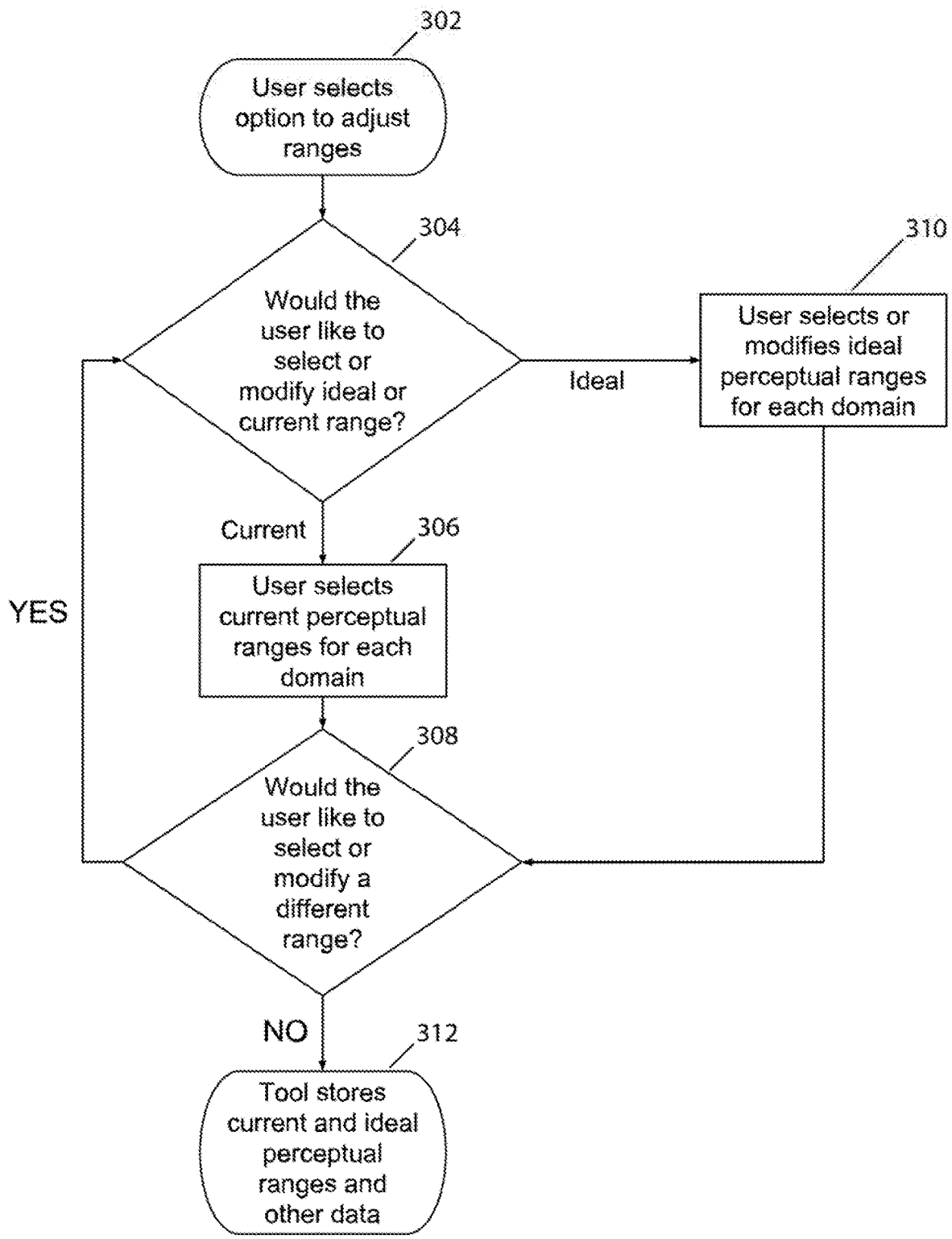
FIG. 3 is an illustration of one method of how the tool can allow entry of ideal perceptual ranges in addition to current perceptual ranges.

FIG. 3 is an illustration of one method of how the tool can allow entry of ideal perceptual ranges in addition to current perceptual ranges. These steps could replace step 112 in FIG. 1. In step 302, the user selects an option to adjust perceptual ranges through the user interface of the tool. In step 304, the tool determines whether the user would like to modify an ideal perceptual range. This determination could be made through a user query or by the intent of an outside entity. If the user selects to modify a current perceptual range, in step 306 the user selects a current perceptual range for each domain previously specified. In step 308, the tool determines whether the user would like to modify a different perceptual range. If so, the tool loops back to step 304. previously specified.

When the user selects to enter an ideal perceptual range, in step 310, the tool allows the user to select an ideal perceptual range or modify an ideal perceptual range if one has previously been selected. An ideal perceptual range represents the range of perceptual data that a user would consider ideal for that particular quality. For example, if the domain is "frequency" and the user is currently observing a behavior in a range of more than half the time to always, but the user would rather observe the behavior never to a quarter of the time, the user could select for the ideal perceptual range to be never to a quarter of the time. Later, this allows the user to visually compare where they are to where they would like to be.

In step 312, the tool stores the current and ideal perceptual ranges for later display and analysis.

Figure 4:
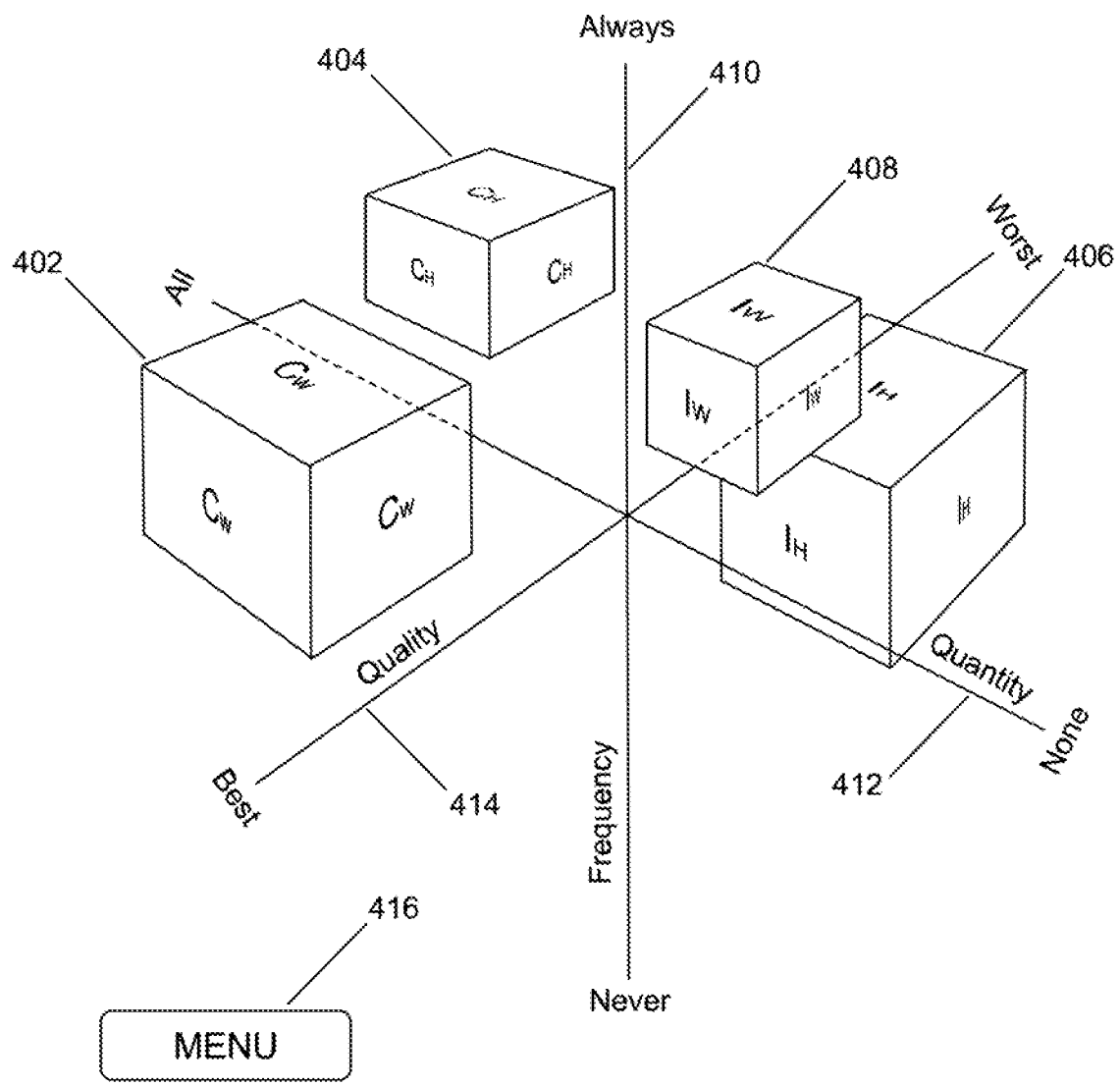
FIG. 4 is an illustration of how the results of the process of FIG. 1 and FIG. 3 may be presented to the user.

FIG. 4 is an illustration of how the results of the process of FIG. 1 and FIG. 3 may be presented to the user. Multiple perceptual ranges are displayed to the user. Current work perceptual range 402 and current home perceptual range 404 represent the user's perception of three different domains in two different contexts. Contexts are discussed further below. Ideal home perceptual range 406 and ideal work perceptual range 408 represent the ideal range of the three different domains in the two different contexts. Those domains are displayed in the frequency axis 410, the quantity axis 412, and the quality axis 414. The tool remains interactive as indicated by the menu button 416 that allows the user to modify all of the data collected.

Figure 5:
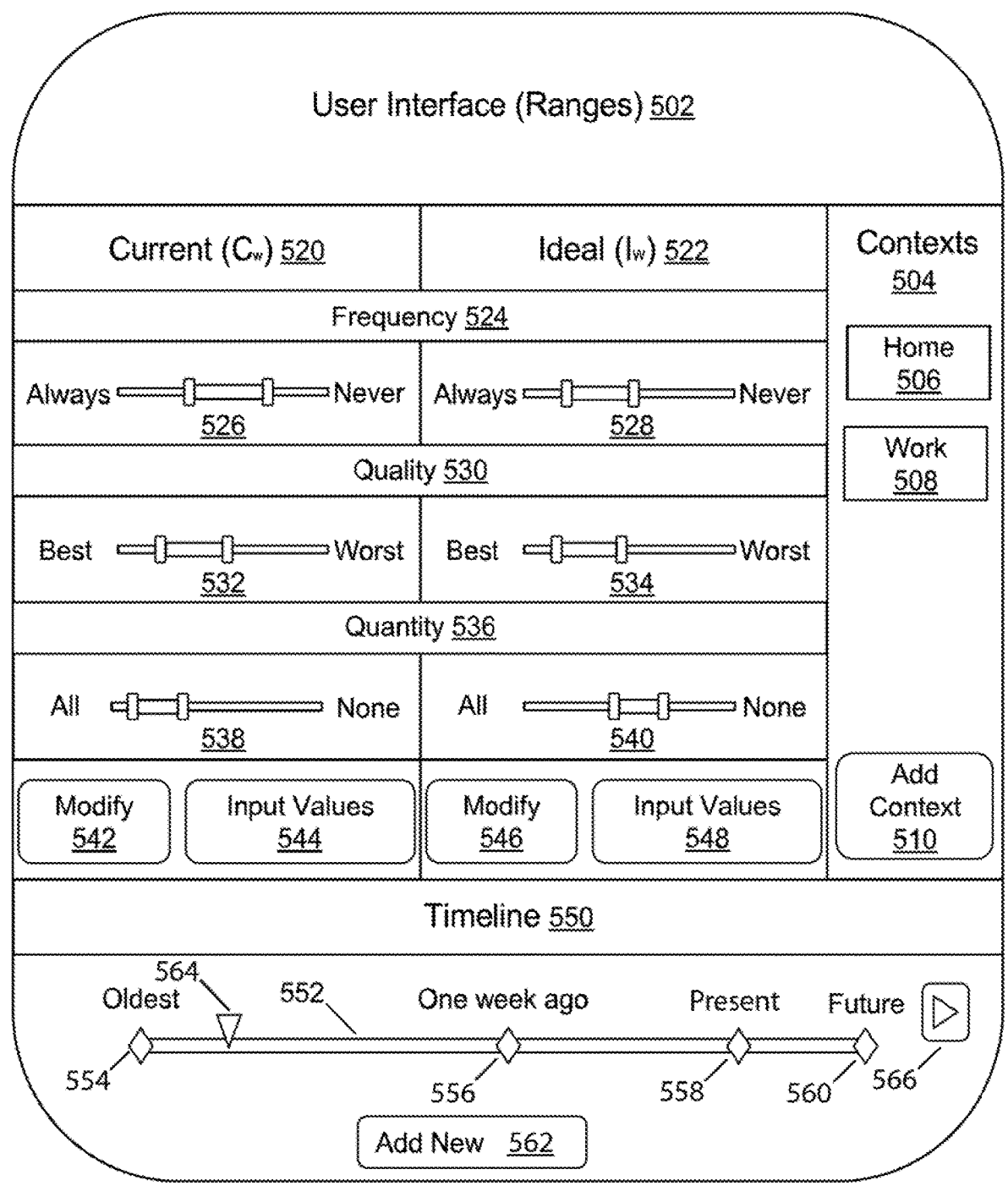
FIG. 5 is an illustration of a potential user interface that allows all of the data of FIG. 4 to be entered.

FIG. 5 is an illustration of a potential user interface that allows all of the data of FIG. 4 to be entered. This interface corresponds to a different technique of entering user data than described in FIG. 3. The user interface 502 allows for multiple contexts 504 to be entered. Two illustrative contexts are displayed, home 506 and work 508. More contexts may be added by using the add context button 510. Some contexts may be linear concepts, such as temperature, altitude, proximity to home, even objective measurements like blood pressure, heart rate or time of day. These contexts are especially amenable to animation or display on linear scales. The relationship between contexts may be displayed by the tool. The display could be textual or graphical. For example, one three-dimensional block could be labeled "home" and another three-dimensional block could be labeled "work." The specific labeling technique depends on the type of contexts being compared.

The user interface 502 is specifically tailored to enter a current perceptual range 520 and an ideal perceptual range 522 for a particular context. The frequency section 524 allows the user to enter a current frequency 526 and an ideal frequency 528. The quality section 530 allows the user to enter a current quality 532 and an ideal quality 534. The quantity section 536 allows the user to enter a current quantity 538 and an ideal quantity 540.

Modify button 542 allows the user to save the entered data for the current perceptual range. The tool may then update the display of the perceptual ranges. Input values button 544 allows the user or an outside entity to enter data numerically. This can be useful when absolute values are desired. One example is where the data corresponds more closely to something with absolute values. Another example is where an outside model describes the ranges that should be seen by a user. Similarly, modify button 546 and input values button 548 allow the user to save entered data and enter data numerically for the ideal perceptual range 522.

The user interface 502 depicts a method for entering timeline section data 550 as well. Time varying information as discussed further below allows the user to perceive how the perceptual ranges in the domain are changing over time. Timeline 552 is drawn with labeled controls which allow the user to select the times at which the various current perceptual ranges 520 and ideal perceptual ranges 522 are entered. In this example, timeline 552 corresponds to the time displayed in the current perceptual range 520 and the ideal perceptual range 522 above. Other entries for oldest time 554, one week ago time 556, present time 558, and future time 560 are shown. By pressing the add new button 562, the user would create new entries where indicator 564 is placed. Play Button 566 causes the tool to animate the graph depicted in FIG. 4 to show the change over time represented by the multiple entries. The timeline 552 and the depiction of the change over time as discussed below is a measurable output that shows the user's internal perceptual transformation over time as the tool is used.

Figure 6:
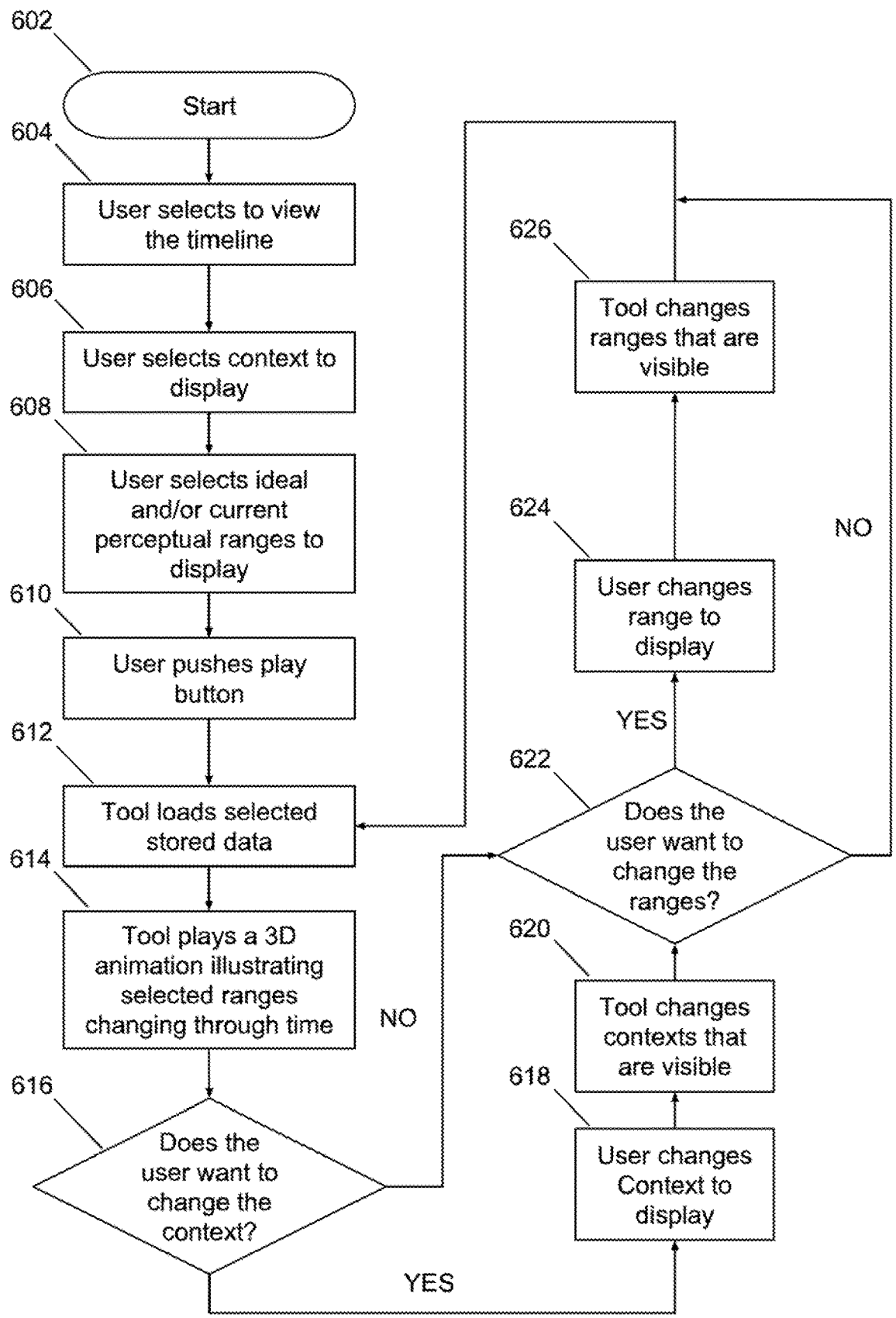

FIG. 6 is an illustration of a set of steps that allow the tool to present a time-varying perception across the domains the user is interested in. The steps begin at step 602 where the tool contains perceptual ranges for domains captured at specific times, in specific contexts, and including ideal perceptual ranges for those times and contexts.

In step 604, the user selects to view a particular timeline. In step 606, the user selects a context or multiple contexts to display. In step 608, the user selects ideal perceptual ranges and/or current perceptual ranges to display. In step 610, the user presses the play button. In step 612, the tool loads all the selected data and builds the images to be displayed. In step 614 the tool plays a three-dimensional animation illustrating the selected perceptual ranges as they change over time. In step 616, the tool determines if a context should be changed. If so, the user changes the context to display in step 618. In step 620, the tool changes the contexts that are visible.

If the user did not want to change the context in step 616 or after the context has been changed in step 620, the tool determines if the user wants to change the perceptual ranges that are displayed. If so, the user changes the perceptual ranges displayed in step 624. In step 626, the tool changes the ranges that are visible. The process continues to step 612 where the tool again loads the stored data and displays the updated animation. This same process could be used to animate one-dimensional or two-dimensional or other multi-dimensional data.

Figure 7:
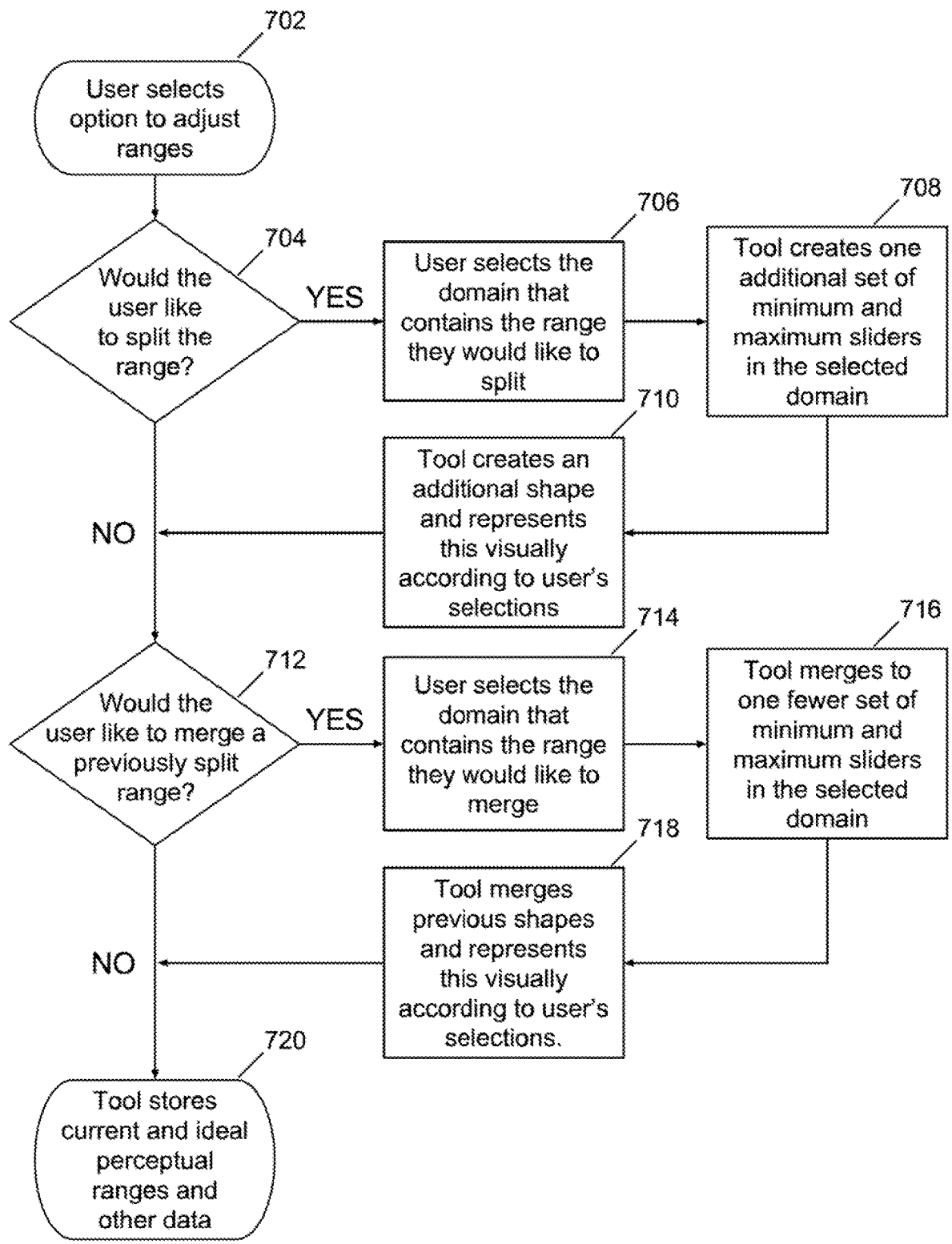
FIG. 7 is an illustration of a set of steps that allow the tool to split and merge a perceptual range.

FIG. 7 is an illustration of a set of steps that allow the tool to split and merge a perceptual range. One potential user interface for implementing these steps is presented in FIG. 5 and discussed above. In step 702, the user selects an option to adjust a range previously entered. In step 704, the tool determines if a user would like to split the selected range. If the user chooses to split the range, in step 706, the user selects the domain that contains the range to split. In step 708, the tool then creates one additional set of minimum and maximum sliders in the selected domain. In step 710, the tool creates an additional shape corresponding to the new minimum and maximum range and the other domains.

In step 712, the tool determines if the user would like to merge a previously split range. If so, in step 714, the user selects the domain that contains the range to be merged. In step 716, the tool merges to one fewer set of minimum and maximum sliders in the selected domain. The merge may occur by removing the lower maximum and the upper minimum of the two ranges. In step 718, the tool creates the merged shape and presents it to the user. In step 720, the tool stores the current and ideal perceptual ranges according to any modification made in the split and merge process.

Figure 8:
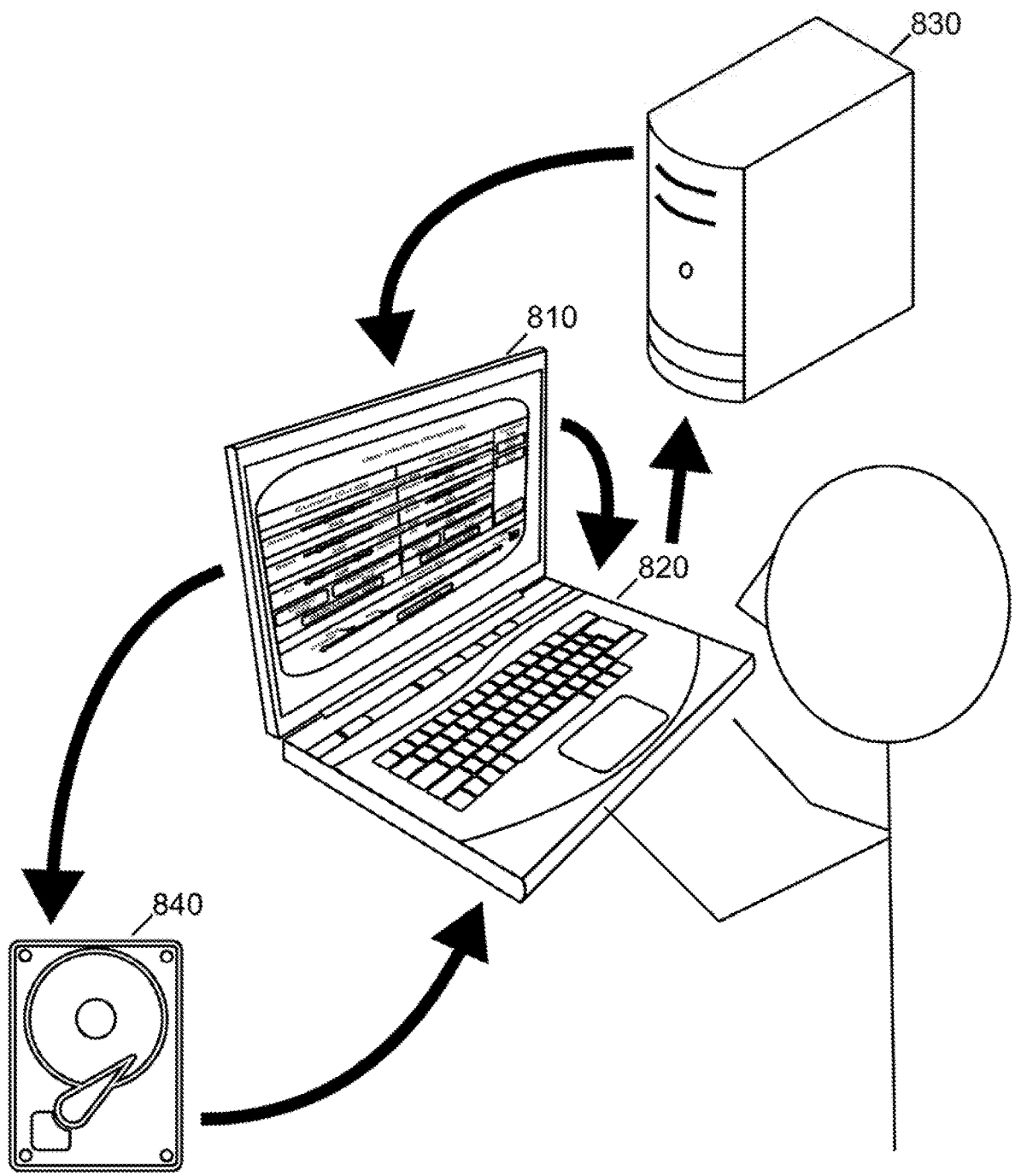
FIG. 8 is an illustration of a system used to implement one embodiment.

FIG. 8 is an illustration of a system used to implement one embodiment. Visual display 810 presents options to a user as described herein. Input mechanism 820 such as a keyboard and mouse allow the user to transmit perceptual domain characteristics to the device. Input mechanism 820 could be implemented as a touch screen, a network interface, or even pen-and-paper notes. Computing device 830, which contains one or more processors and one or more non-transitory computer-readable storage media, creates a current perceptual range from the received perceptual domain characteristics. The computing device 830 converts the perceptual range into a 3-dimensional representation of the current perceptual range. Visual display 810 presents the 3-dimensional representation to the user. Storage device 840 stores the perceptual range for later use and comparison.

The invention claimed is:

1. A process performed by one or more processing devices, comprising:
   receiving at one or more processing devices a first individualized perceptual domain, a second individualized perceptual domain, and a third individualized perceptual domain;
   receiving, at the one or more processing devices, a first perceptual characteristic range of a behavior chosen from the first individualized perceptual domain;
   receiving, at the one or more processing devices, a second perceptual characteristic range of the behavior chosen from the second individualized perceptual domain;
   receiving, at the one or more processing devices, a third perceptual characteristic range of the behavior range chosen from the third individualized perceptual domain;
   creating, in the one or more processing devices, a current perceptual range from the first perceptual characteristic range of the behavior, the second perceptual characteristic range of the behavior, and the third perceptual characteristic range of the behavior;
   converting, in the one or more processing devices, the current perceptual range into a 3-dimensional representation of the current perceptual range within the first individualized perceptual domain, the second individualized perceptual domain, and the third individualized perceptual domain;
   and presenting the 3-dimensional representation of the current perceptual range.

2. The process of claim 1 further comprising:
   receiving a fourth perceptual characteristic range chosen from the first individualized perceptual domain;
   receiving a fifth perceptual characteristic range of the behavior chosen from the second individualized perceptual domain;
   receiving a sixth perceptual characteristic range of the behavior range chosen from the third individualized perceptual domain;
   receiving a new current perceptual range from the fourth perceptual characteristic range of the behavior, the fifth perceptual characteristic range of the behavior, and the sixth perceptual characteristic range of the behavior;
   and presenting a time series of a new 3-dimensional representation of the current perceptual range within the first individualized perceptual domain, the second individualized perceptual domain, and the third individualized perceptual domain and the new current perceptual range within the first individualized perceptual domain, the second individualized perceptual domain, and the third individualized perceptual domain.

3. The process of claim 2 further comprising:
   presenting the time series as an animation wherein the animation shows a change over time from the current perceptual range to the new current perceptual range.

4. The process of claim 1 further comprising:
   receiving a first ideal range chosen from the first individualized perceptual domain;
   receiving a second ideal range chosen from the second individualized perceptual domain;
   receiving a third ideal range chosen from the third individualized perceptual domain;
   creating an ideal range from the first ideal range, the second ideal range, and the third ideal range;
   and presenting a new 3-dimensional representation of the current perceptual range within the first individualized perceptual domain, the second individualized perceptual domain, and the third individualized perceptual domain and the ideal range within the first individualized perceptual domain, the second individualized perceptual domain, and the third individualized perceptual domain.

5. The process of claim 4 further comprising:
   modifying the first ideal range from the first individualized perceptual domain;
   modifying the second ideal range from the second individualized perceptual domain;
   modifying the third ideal range from the third individualized perceptual domain;
   creating a modified perception range from the first ideal range of the behavior, the second ideal range of the behavior, and the third ideal range of the behavior;
   and presenting a 3-dimensional representation of the current perceptual range within the first individualized perceptual domain, the second individualized perceptual domain, and the third individualized perceptual domain.

6. The process of claim 1 wherein presenting a 3-dimensional representation of the current perceptual range further comprises:

labeling a first axis with a first name of the first individualized perceptual domain;
labeling a second axis with a second name of the second individualized perceptual domain;
and labeling a third axis with a third name of the third individualized perceptual domain.

7. The process of claim 1 wherein presenting a 3-dimensional representation of the current perceptual range further comprises:
labeling a first axis with a first name of a first maximum of the first individualized perceptual domain;
labeling a second axis with a second name of a second maximum of the second individualized perceptual domain;
labeling a third axis with a third name of a third maximum of the third individualized perceptual domain.

8. The process of claim 1 wherein presenting a 3-dimensional representation of the current perceptual range further comprises:
labeling a first axis with a first name of a first minimum of the first individualized perceptual domain;
labeling a second axis with a second name of a second minimum of the second individualized perceptual domain;
and labeling a third axis with a third name of a third minimum of the third individualized perceptual domain.

9. The process of claim 1 wherein the first individualized perceptual domain, the second individualized perceptual domain, and the third individualized perceptual domain are pre-selected by an outside entity.

10. The process of claim 1 further comprising:
receiving a first pre-selected range regarding the first individualized perceptual domain;
receiving a second pre-selected range regarding the second individualized perceptual domain;
receiving a third pre-selected range regarding the third individualized perceptual domain;
creating a pre-selected range from the first pre-selected range, the second pre-selected range, and the third pre-selected range;
and presenting a 3-dimensional representation of the current perceptual range and the pre-selected range.

11. The process of claim 1 further comprising:
receiving a first context wherein the current perceptual range applies;
receiving a second context wherein a second perception range applies;
presenting the 3-dimensional representation of the current perceptual range and a second 3-dimensional representation of the second perception range within the first individualized perceptual domain, the second individualized perceptual domain, and the third individualized perceptual domain;
and labeling the 3-dimensional representation of the current perceptual range with the first context and the second 3-dimensional representation of the second perception range with the second context.

12. The process of claim 11 wherein the second context is a sub-context of the first context.

13. The process of claim 11 further comprising presenting a relationship between the first context and the second context.

14. The process of claim 1 wherein the first individualized perceptual domain is a quantity of a behavior, the second individualized perceptual domain is a quality of the behavior, and the third individualized perceptual domain is a frequency of the behavior.

15. One or more storage devices storing instructions that are executable to perform operations comprising:
receiving a first individualized perceptual domain, a second individualized perceptual domain, and a third individualized perceptual domain;
receiving a first perceptual characteristic range of a behavior chosen from the first individualized perceptual domain;
receiving a second perceptual characteristic range of the behavior chosen from the second individualized perceptual domain;
receiving a third perceptual characteristic range of the behavior range chosen from the third individualized perceptual domain;
creating a current perceptual range from the first perceptual characteristic range of the behavior, the second perceptual characteristic range of the behavior, and the third perceptual characteristic range of the behavior;
converting the current perceptual range into a 3-dimensional representation of the current perceptual range within the first individualized perceptual domain, the second individualized perceptual domain, and the third individualized perceptual domain;
and presenting the 3-dimensional representation of the current perceptual range.

16. The one or more storage devices storing instructions that are executable to perform the operations of claim 15, further comprising:
receiving a fourth perceptual characteristic range chosen from the first individualized perceptual domain;
receiving a fifth perceptual characteristic range of the behavior chosen from the second individualized perceptual domain;
receiving a sixth perceptual characteristic range of the behavior range chosen from the third individualized perceptual domain;
receiving a new current perceptual range from the fourth perceptual characteristic range of the behavior, the fifth perceptual characteristic range of the behavior, and the sixth perceptual characteristic range of the behavior;
and presenting a time series of a new 3-dimensional representation of the current perceptual range within the first individualized perceptual domain, the second individualized perceptual domain, and the third individualized perceptual domain and the new current perceptual range within the first individualized perceptual domain, the second individualized perceptual domain, and the third individualized perceptual domain.

17. The one or more storage devices storing instructions that are executable to perform the operations of claim 15, further comprising:
receiving a first ideal range chosen from the first individualized perceptual domain;
receiving a second ideal range chosen from the second individualized perceptual domain;
receiving a third ideal range chosen from the third individualized perceptual domain;
creating an ideal range from the first ideal range, the second ideal range, and the third ideal range;
and presenting a new 3-dimensional representation of the current perceptual range within the first individualized perceptual domain, the second individualized perceptual domain, and the third individualized perceptual domain and the ideal range within the first individualized perceptual domain, the second individualized perceptual domain, and the third individualized perceptual domain.

18. The one or more storage devices storing instructions that are executable to perform the operations of claim 15 wherein presenting a 3-dimensional representation of the current perceptual range further comprises:
labeling a first axis with a first name of the first individualized perceptual domain;
labeling a second axis with a second name of the second individualized perceptual domain;
and labeling a third axis with a third name of the third individualized perceptual domain.

19. A computer-implemented system comprising:
one or more processors;
one or more non-transitory computer-readable storage media containing instructions configured to cause the one or more processors to perform operations including:
receiving, at the one or more processors, a first individualized perceptual domain, a second individualized perceptual domain, and a third individualized perceptual domain;
receiving, at the one or more processors, a first perceptual characteristic range of a behavior chosen from the first individualized perceptual domain;
receiving, at the one or more processors, a second perceptual characteristic range of the behavior chosen from the second individualized perceptual domain;
receiving, at the one or more processors, a third perceptual characteristic range of the behavior range chosen from the third individualized perceptual domain;
creating, in the one or more processors, a current perceptual range from the first perceptual characteristic range of the behavior, the second perceptual characteristic range of the behavior, and the third perceptual characteristic range of the behavior;
converting, in the one or more processors, the current perceptual range into a 3-dimensional representation of the current perceptual range within the first individualized perceptual domain, the second individualized perceptual domain, and the third individualized perceptual domain;
and presenting the 3-dimensional representation of the current perceptual range.

20. The system of claim 19 wherein the one or more non-transitory computer-readable storage media contains further instructions configured to cause the one or more processors to perform operations including:
receiving, at the one or more processors, a fourth perceptual characteristic range chosen from the first individualized perceptual domain;
receiving, at the one or more processors, a fifth perceptual characteristic range of the behavior chosen from the second individualized perceptual domain;
receiving, at the one or more processors, a sixth perceptual characteristic range of the behavior range chosen from the third individualized perceptual domain;
receiving, at the one or more processors, a new current perceptual range from the fourth perceptual characteristic range of the behavior, the fifth perceptual characteristic range of the behavior, and the sixth perceptual characteristic range of the behavior;
and presenting a time series of a new 3-dimensional representation of the current perceptual range within the first individualized perceptual domain, the second individualized perceptual domain, and the third individualized perceptual domain and the new current perceptual range within the first individualized perceptual domain, the second individualized perceptual domain, and the third individualized perceptual domain.

* * * * *